I. J. WEBSTER.
PNEUMATIC TIRE.
APPLICATION FILED MAR. 23, 1915.

1,149,008.

Patented Aug. 3, 1915.

WITNESSES

INVENTOR
I. J. Webster
BY
ATTORNEYS

UNITED STATES PATENT OFFICE.

IRA J. WEBSTER, OF HAVERHILL, MASSACHUSETTS, ASSIGNOR TO RELIANCE A. C. COMPANY, INC., OF NEW YORK, N. Y., A CORPORATION OF NEW YORK.

PNEUMATIC TIRE.

1,149,008. Specification of Letters Patent. Patented Aug. 3, 1915.

Original application filed October 21, 1914, Serial No. 867,697. Divided and this application filed March 23, 1915. Serial No. 16,348.

*To all whom it may concern:*

Be it known that I, IRA J. WEBSTER, a citizen of the United States, residing at Haverhill, in the county of Essex and State of Massachusetts, have invented certain new and useful Improvements in Pneumatic Tires, of which the following is a full, clear, and exact description, such as will enable others skilled in the art to which it appertains to make and use the same.

This invention relates to tires, and with respect to its more specific features, to pneumatic tubes adapted to be utilized in or as tires.

One of the objects of the invention is the provision of a pneumatic tire offering a relatively high resistance to puncture and adapted to automatically operate to close or seal punctures.

Another object of the invention is the provision of a durable tire of the character described of a simple and inexpensive construction.

Another object of the invention is the provision of an efficient pneumatic tire of the character described which shall be relatively light in weight, and yet retain the qualities of resistance to puncture and the automatic closing of punctures as referred to.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

Figure 1:
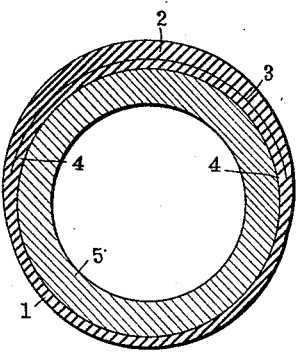
Figure 2:
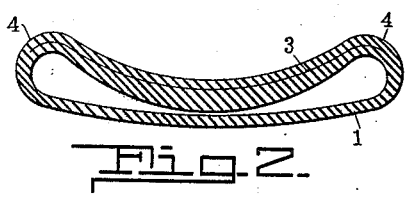
Figure 3:
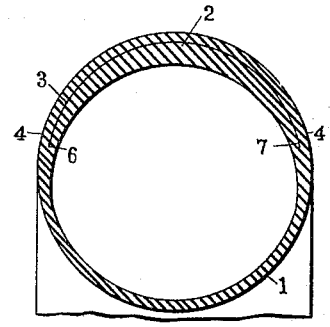
Figure 4:
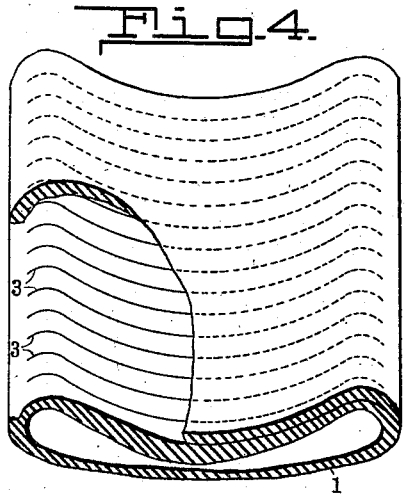
Figure 5:
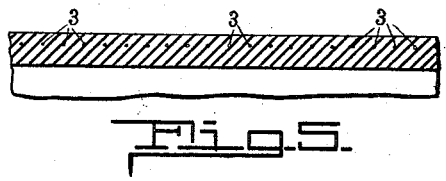

In the accompanying drawings, wherein similar reference characters refer to similar parts throughout the several views, Figure 1 is a sectional view of a mandrel with the tire or tube formed thereon. Fig. 2 illustrates the tire or tube when stripped from the mandrel, and after reversal. Fig. 3 illustrates the tire or tube after having been reversed and inflated. Fig. 4 is a plan of a portion of the tire or tube partly broken away; and Fig. 5 is a longitudinal section of a portion of the tire or tube shown in Fig. 3, but enlarged for clearer disclosure.

This application is a division of applicant's application, Serial No. 867,697, filed October 21, 1914.

The tire forming the subject-matter of the present invention is so constructed that when in use a portion of the material composing the same is placed under compression. Pneumatic tires are usually made of rubber, and when the same are inflated, portions thereof usually assume a curved or arcuate form. If the material of the tire is unrestrained under the influence of the pressure of inflation it is placed in a state of tension and it follows that such material when perforated under such condition has a tendency to separate at the punctured point. Thus the puncture has a tendency to enlarge. By the present invention, however, a portion of the tire is placed under compression upon inflation and the compressed part not only tends to resist puncture to a greater degree than a tire entirely under tension, but also the part under compression automatically operates to close a puncture made therein.

Referring now more particularly to the drawings, the numeral 1 indicates a tire or an inner tube which may form a part of a tire, as the case may be, of elastic material, rubber being preferred, and preferably also a portion of this tube is thickened as at 2, said thickened portion being disposed opposite the tread portion of the tire and also providing ample material for the coöperation of threads, hereinafter referred to, which threads are employed for efficiently obtaining and retaining the compression referred to.

The numerals 3, 3 indicate a series of independent or disconnected members which are so associated with the tire or tube as to cause portions thereof to be compressed when the tire or tube is inflated. Although non-extensible members might be employed in some instances, and are within the purview of this invention, members having some degree of extensibility possess distinct advantages in relation to the invention. Hence in the embodiments herein specifically disclosed these members are provided by practically inelastic threads of cord or twine, the same having some natural extensibility and having sufficient tensile strength to withstand the strains of inflation or the strains in use without parting where they extend transversely of the tire. In the present embodiment, the threads 3, 3, are embedded in the rubber of the tire adjacent the edges, as at 4, 4, of the tread portion thereof, and they extend transversely of the tire opposite said tread portion, and preferably are also embedded in the tire opposite said tread portion, so that in the embodiment illustrated, said threads are embedded in the tire throughout their length and throughout the width of the tread. These threads are so disposed relatively to each other as to permit the material of the tire to contact therewith throughout the length of the thread at all embedded points, this result being facilitated by spacing the adjacent threads relatively to each other longitudinally of the tire, the material of the tire entering into the spaces between the adjacent threads and serving to preserve their spaced relationship. The threads 3, 3, may be drawn through an adhesive substance before being placed in the tire, said substance serving to assist in retaining the threads in position.

The ends of the threads 3, 3, are preferably located adjacent the edges of the tread of the tire and are embedded in the rubber adjacent said edges, preferably somewhat deeper than are the intermediate portions, said intermediate portions lying nearer the outer surface of the tire. In this way all the tire compressing threads are securely retained opposite the tread portion and are buried in the tread to such an extent as not to be exposed to wear. By reason of the ends of the threads being longitudinally separated from the ends of adjacent threads, it follows that should sufficient wear take place to expose the ends of certain threads, any separation of such exposed ends from the rubber material of the tire would not affect the ends of adjacent threads. Hence, if the end of one thread were peeled from the tire, the peeling of adjacent threads would not necessarily follow. This advantage is a substantial one as the lasting qualities of the tire are more or less dependent thereon.

The tire or tube above described may be made in any suitable manner which will effect the objects sought. In Fig. 1 is shown a cylindrical mandrel 5, on which the rubber tube or tire may be built up by successive layers or portions of rubber vulcanized to each other so as to present a practically integral structure. After some thickness has been attained the threads referred to may be laid in position, whereupon additional layers of rubber are placed in position over the thread, the tube being thus thickened at the portion occupied by the thread, this thickened portion being designed to be opposite the tread portion of the tire. The tube so made is stripped from the mandrel and turned inside out, whereupon it when not inflated may assume a shape such as shown in Fig. 2. It is then ready to be inflated, and when inflated the transversely disposed threads cause the material or rubber of the tube to be placed under compression on the inside as between the points 6 and 7, around the tire at the thickened portion. The amount of compression will of course depend more or less upon the transverse curvature of the tire, but in any case, sufficient compression may be obtained so that the compressed portion will resist puncture to a greater degree than the uncompressed portion, and it will be clear that should a puncture occur in the compressed portion, the material thereof will expand, thus automatically closing or sealing the puncture. The plane occupied by the threads may be at any radial point in the thickness of the tire or tube, but is preferably somewhat farther from the inner than the outer surface, so as to provide on the inside ample volume of rubber to be compressed. On account of the fact that the tread of the tire has a tendency to wear more quickly adjacent the edges, the ends of the threads may be embedded somewhat deeper adjacent said edges as previously referred to.

It is of course to be understood that the threads may be placed at other portions of the tire than opposite the tread, either by employing another set or sets of threads or by extending the tread threads transversely farther around the tire. In this manner the compressive effect adjacent the tread may be maintained, while the resistance of other parts of the tube or tire to "blow-outs" is increased.

Thus by the above described construction are accomplished, among others, the objects hereinbefore stated.

Having described my invention, what I claim as new and desire to secure by Letters Patent is:—

1. In a pneumatic tire, in combination, a tread portion, and a series of transversely disposed disconnected tire compressing threads opposite said tread portion, a portion of said threads being embedded in the tire, said threads being so disposed as to permit the material of the tire to contact therewith at all embedded points.

2. In a pneumatic tire, in combination, a tread portion, and a series of transversely disposed disconnected tire compressing threads opposite said tread portion, adjacent threads being spaced from each other longitudinally of the tire.

3. In a pneumatic tire, in combination, a tread portion, and a series of transversely disposed disconnected tire compressing threads opposite said tread portion, adjacent threads being spaced from each other longitudinally of the tire and having portions embedded in the tire.

4. In a pneumatic tire, in combination, a tread portion, and a series of transversely disposed disconnected tire compressing threads opposite said tread portion, adjacent threads being spaced from each other longitudinally of the tire and having portions embedded in the tire adjacent the sides of the tread.

5. In a pneumatic tire, in combination, a tread portion, and a series of transversely disposed disconnected tire compressing threads opposite said tread portion, adjacent threads being spaced from each other longitudinally of the tire and having portions embedded in the tire between the sides of the tread.

6. In a pneumatic tire, in combination, a tread portion, and a series of transversely disposed disconnected tire compressing threads opposite said tread portion, adjacent threads being spaced from each other longitudinally of the tire and having portions embedded in the tire throughout the width of the tread.

7. In a pneumatic tire, in combination, a tread portion, and a series of transversely disposed disconnected tire compressing threads opposite said tread portion, adjacent threads being spaced from each other longitudinally of the tire, the ends of said threads being embedded in the tire.

In testimony whereof I affix my signature, in the presence of two witnesses.

IRA J. WEBSTER.

Witnesses:
  C. H. DUELL, Jr.,
  HERBERT F. HARTWELL.